(No Model.)
W. H. PARKIN.
EMERY KNIFE SHARPENER.
No. 339,683. Patented Apr. 13, 1886.
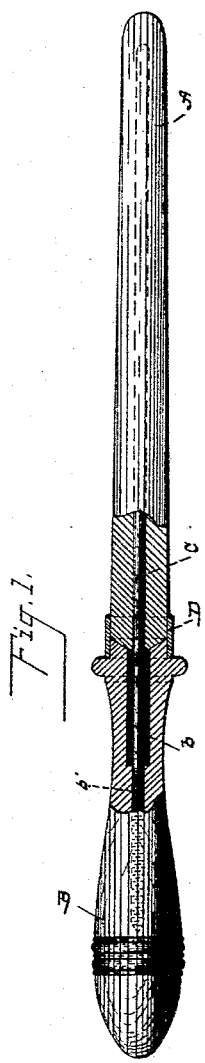
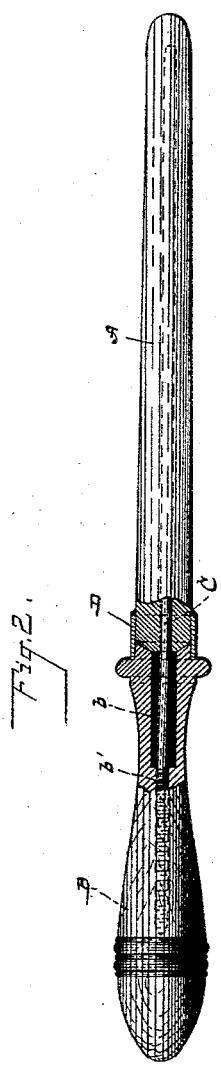
WITNESSES
INVENTOR
William H. Parkin.
By Jno. Crowell
Attorney ptt
UNITED STATES PATENT OFFICE.

WILLIAM H. PARKIN, OF CLEVELAND, OHIO.

EMERY KNIFE-SHARPENER.

SPECIFICATION forming part of Letters Patent No. 339,683, dated April 13, 1886.

Application filed June 30, 1885. Serial No. 170,317. (No model.)

*To all whom it may concern:*

Be it known that I, WILLIAM H. PARKIN, of Cleveland, in the county of Cuyahoga and State of Ohio, have invented certain new and useful Improvements in Emery Knife-Sharpeners; and I do hereby declare the following to be a full, clear, and exact description of the invention, such as will enable others skilled in the art to which it pertains to make and use the same.

My invention relates to improvements in knife-sharpeners; and it consists in certain features of construction, and in combination of parts hereinafter described, and pointed out in the claim.

In the accompanying drawings, Figures 1 and 2 are elevations, partly in section, of my improved knife-sharpener.

A represents the shaft or sharpener proper; B, the handle; and C, a spindle upon which the shaft is built, and by means of which the latter is secured to the handle.

D is a ferrule, that fits on the butt of the shaft A and on the reduced end of the handle, by means of which the joint between the shaft and handle is concealed and the parts kept in line and the handle prevented from splitting.

The shaft or sharpener proper is made in the following manner: Into a mold of suitable shape, and divided longitudinally through the center, is packed a preparation of emery, corundum, or the two combined, thoroughly mixed with some suitable binder—such, for instance, as glue, shellac, &c.—with a spindle, C, inserted as near as may be in the center of the mass. The mass is then removed from the mold and baked or dried. The sharpeners are then provided with handles. The greatest difficulty encountered was in mounting the handles, and arose from the fact that the spindles were not always located centrally in the shaft A. (See Fig. 2.) The handles are prepared in a lathe and are, of course, turned true, and with the hole for the spindle located in the center and the ferrule concentric with the spindle. When, therefore, a spindle was not centrally located within the shaft the parts would not come together, or, if brought together by some adjustment of the ferrule, the parts would not be in line, and the result would be a bungling device that would be unsalable. To remedy this difficulty I make the front part of the hole $b$ considerably larger than the spindle. The remainder of the hole $b'$ is made of suitable size to fit and retain the spindle. The spindle being slight, it is easily sprung to the one side, as shown in Fig. 2, so that the shaft A is entered without difficulty in the ferrule D, bringing the shaft and handle in line, and making a good job.

What I claim is—

A sharpener for knives, consisting of a handle formed with an outer opening, $b$, and inner opening, $b'$, a shaft, and a spindle embedded in the shaft and secured in the inner opening, the outer opening forming a chamber surrounding the spindle between the shaft and the inner opening, substantially as set forth.

In testimony whereof I sign this specification, in the presence of two witnesses, this 19th day of June, 1885.

WILLIAM H. PARKIN.

Witnesses:
N. S. AMSTUTZ,
G. W. SHUMWAY.